March 21, 1967     H. C. BODEN     3,310,324
PANEL JOINT CONSTRUCTION AND CONNECTOR
Filed Oct. 9, 1964

HERBERT C. BODEN
INVENTOR

BY BUCKHORN, BLORE, KLARQUIST & SPARKMAN
ATTORNEYS

United States Patent Office 3,310,324
Patented Mar. 21, 1967

3,310,324
PANEL JOINT CONSTRUCTION AND CONNECTOR
Herbert C. Boden, 9101 NE. 4th Ave.,
Portland, Oreg. 97211
Filed Oct. 9, 1964, Ser. No. 402,731
4 Claims. (Cl. 287—20.92)

The present invention relates to a panel joint construction and more particularly to a connector joint between a panel and a panel-supporting member.

Over the past several years plywood and other types of wall paneling have become a very popular building material. However, the joining of such paneling to panel-supporting columns has always been a problem in that no entirely satisfactory panel joint has been devised that is both easy to construct and sound when made.

Accordingly, a primary object of the invention is to provide a new and improved panel joint construction.

Another object of the invention is to provide a connector joint between a panel and a panel-supporting member than can be made and assembled easily and quickly on the job site.

A further object is to provide a connector joint for a panel that can be partially prefabricated.

Another object is to provide a panel joint construction that is rigid and permanent.

Another primary object is to provide a fastener means for joining a panel to a panel-supporting member which is simple and inexpensive to make and easy to apply.

Another object is to provide a fastener means of the above type which provides a firm, interlocking connection between a panel and a panel-supporting member upon insertion of the panel into a groove in the supporting member.

A further object is to provide a method of joining a panel to a panel-supporting member.

In furtherance of the above objects an illustrated embodiment of my joint construction includes a column provided with a groove for receiving an edge of a wall panel. A flat metal connector strip extends into the groove along one sidewall thereof. The strip has several rows of integral tangs inclined outwardly from the main body thereof, including a first row projecting outwardly and toward the adjacent sidewall of the groove and a second row projecting in the opposite direction, toward the bottom of the groove. Thus, when an edge of a panel is driven into the groove, the first row of tangs bite into the sidewall of the groove to lock the strip to the supporting column, whereas upon continued driving of the panel into the groove, the other row of tanks bite into the panel to resist removal of the panel from the groove.

The above and other objects and advantages of the invention will become more apparent in the following detailed description and the accompanying drawing wherein.

Figure 1:
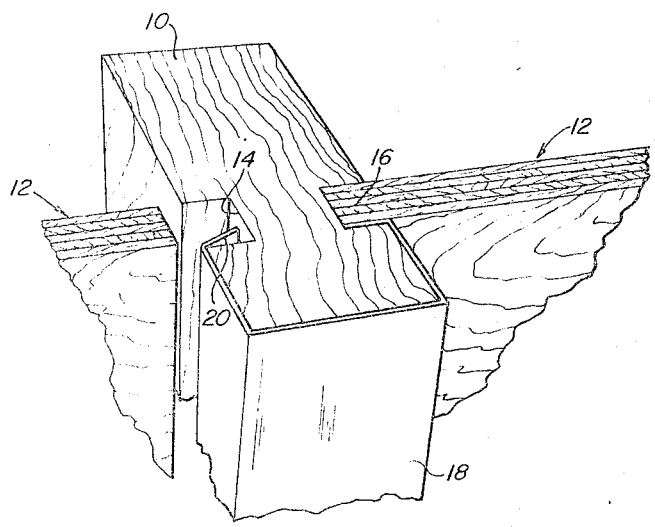
FIG. 1 is a fragmentary perspective view showing a joint between a column and a wall panel in accordance with the present invention.

With reference to the drawings, FIG. 1 illustrates a partially completed joint between a column, or supporting member, 10 and a pair of wall panels 12. Both the column and the panels are preferably made of wood and may be of either solid, composite or laminate construction. The column is provided with a pair of longitudinally extending grooves 14 on opposite sides thereof, each of a width for snugly receiving an edge portion 16 of one of the panels 12. In the illustrated embodiment it is clear that the grooves are placed so that the panels, when assembled, will be in longitudinal alignment with each other, although it will be equally clear that a corner joint could be formed by providing the grooves on adjacent faces of the column.

A one-piece sheet metal connector strip 18 is used to fasten both of the panels 12 within their respective grooves 14. For this purpose the strip is preformed, as by bending, into a configuration such that the opposed flat edge portions 20 of the strip extend one into each of the grooves 14 along one sidewall 22 thereof, terminating adjacent the bottoms 23 of the grooves. In the illustrated embodiment the connector strip is generally channel-shaped to conform to the cross-sectional shape of the outwardly facing portion of the column.

Each end portion 20 of the connector strip is provided with integral tang means for fastening the strip to the column and for locking a panel 12 within a groove. The illustrated tank means includes three rows of tangs on each end portion, including an outer, first row of tangs 24 inclined in a direction outwardly and toward the sidewall 22 of the groove, a second row of tangs 26 spaced inwardly of the outer row 24 and inclined in a direction opposite to that of the first row, that is, in a direction away from the sidewall 22 and toward the bottom 23 of the groove, and a third row of tangs 28 projecting in the same general direction as the outer row of tangs 24. Thus, as the edge portion 16 of each panel 12 is driven initially into its respective groove, the outer row of tangs 24 first bite into the sidewall 22 to lock the connector strip to the column. Upon continued driving of the panel into the groove, the second row of tangs 26 bite into the panel to resist withdrawal of the panel from the groove. When the panel 12 is driven into the groove to the full depth of the latter, the third row of tangs 28 also penetrate the sidewall 22 so that the panel, connnector strip and column form a rigid, interlocked joint that cannot, under normal circumstances, be disassembled.

Figure 2:
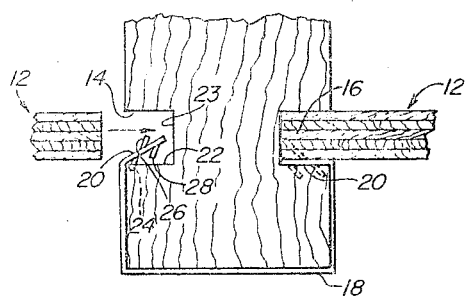
FIG. 2 is an end view of the joint of FIG. 1.
Figure 3:
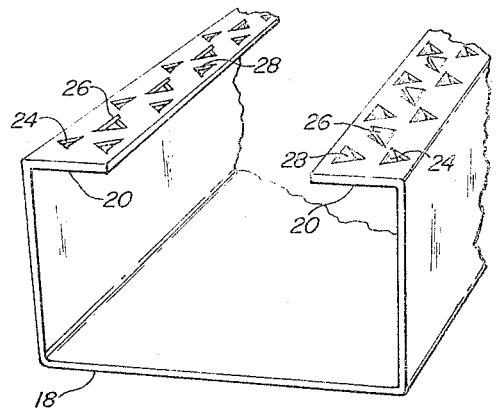
FIG. 3 is a fragmentary perspective view of a portion of the connector strip used in the joint construction of FIG. 1.

The tangs 24, 26 and 28 may be identical to each other in form, although the rows alternate in direction. As will be apparent from FIG. 2, the rows of tangs 24 and 28 are inclined in a direction so as to lock the metal strip 18 to the column and resist sliding movement of the strip ends 20 out of their respective grooves, whereas the oppositely directed tangs 26 positively resist withdrawal of the panel from the groove. The tangs may be of any form so long as they are capable of penetrating the wood of the panels and panel-supporting members and are capable of resisting collapse when sandwiched between the sidewall of the groove and a panel inserted therein. For example, the triangular, sharp-pointed tangs illustrated in FIG. 3, which may be formed by punching the same from the metal strip with a suitably shaped tool and mating die, have been found to fulfill the above requirements.

In assembling a joint, the metal connector strip 18 may be preassembled on the column 10 at the plant. No fasteners should be necessary for this preassembly as friction between the metal unit and the column will retain the unit in place. The grooves in the column itself are also preferably preformed. Thus the column assembly, consisting of the column and the preattached metal connector strip, once erected at the job site, is ready for receiving panels such as the panels 12. The panels 12 are then quickly and easily joined to the column 10 simply by driving the edge portions 16 of the panels into their respective grooves 14. No additional fastening means are necessary to complete assembly of the joint. The metal connector channel 18 serves the dual purpose of providing a fastening means for securing the paneling to the columns, and also providing a metal-clad outer facing for the column to protect the latter from damage.

Of course, it will be apparent that numerous other forms of metal connector strips may be used to secure the joint, so long as the strip for fastening each panel within a groove of a column includes a tanged portion extending along at least one sidewall of the groove. For example, separate metal connector strips could be employed for each groove of a column, in which case the strip would not serve as a cladding for the outer face of the column. Alternatively, a connector strip could be formed so as to line both sidewalls of a single groove to provide additional fastening strength.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A fastener element for locking a pair of panels within grooves on opposite sides of a panel-supporting member, said element comprising:
   an elongate, channel-shaped metal member for enveloping a face and opposed sidewall portions of said panel-supporting member,
   said channel-shaped member having opposed, inwardly directed end portions each for extending into and along one sidewall of one of said pair of oppositely exposed grooves in said supporting member,
   each of said end portions having at least three rows of integral tangs including:
   a first outer row of tangs extending inwardly of said channel-shaped member for locking said channel-shaped member to said supporting member,
   a second, middle row of tangs extending outwardly of said channel-shaped member for interlocking with a panel driven into the associated said groove,
   and a third, inner row of tangs extending inwardly of said channel-shaped member to lock said channel-shaped member to said supporting member.

2. A connector joint between a pair of upstanding wall panels and a common panel-supporting column,
   said panel-supporting column having a pair of grooves therein one on each of two different sides thereof, each receiving an end portion of one of said panels,
   an elongate metal fastener strip, angular in cross section, extending continuously from one grooved side of said column to the other grooved side thereof,
   said strip including a first end flange extending into and along one sidewall only of one of said grooves and another end flange extending into and along one sidewall only of the other of said grooves,
   each of said end flanges including:
      an outer row of integral tangs projecting toward said one sidewall of the associated said groove and inclined in a direction outwardly of said groove so that said tangs penetrate said sidewall upon the initial driving of the associated said panel into said groove and resist removal of said strip from said column,
      and an inner row of integral tangs spaced inwardly of said outer row of tangs relative to the bottom of the associated said groove, said second row of tangs projecting in a direction away from said one sidewall and toward the bottom of said associated groove for penetrating said panel and resisting withdrawal of the same upon continued driving of said panel into said groove,
   whereby the driving of said panels into said grooves effects first a locking interengagement of said fastener strip with said column and thereafter a locking interengagement of said fastener strip with said panels so as to provide a rigid structural joint.

3. A fastener element for locking a pair of aligned panels within grooves in opposite sides of a common panel-supporting member, said element comprising:
   an elongate, generally channel-shaped metal member for enveloping a face and opposed sidewall portions of said panel-supporting member,
   said channel-shaped member having oppositely disposed inwardly directed end flange portions each for extending into and along one sidewall of one of said pair of grooves,
   each of said end flange portions having at least two rows of integral tangs extending along the length thereof including:
      a first outer row of tangs extending inwardly of said channel-shaped member so that when a panel is driven initially into said groove, said outer row of tangs will be driven first into said sidewall of said groove and thereby lock said channel-shaped member to said supporting member,
      and a second row of tangs spaced inwardly of said outer row of tangs relative to the bottom of the associated groove, said second row of tangs extending outwardly of said channel-shaped member for interlocking with a panel after the channel-shaped member has been locked to said supporting member and upon continued driving of the panel into the associated said groove.

4. A fastener device for locking a pair of aligned panels within grooves in opposite sides of a common panel supporting member, said device comprising:
   an elongate, generally channel-shaped metal member having one side for enveloping a face of said panel supporting member, and a pair of opposed sides normal to said one side for covering opposed sidewall portions of said panel supporting member,
   said channel-shaped member having oppositely disposed end flanges extending inwardly toward one another from the outer ends of said opposed sides, each for extending into and along one sidewall of one of said pair of grooves,
   said channel-shaped member including means for fastening said channel member to said common panel supporting member,
   each of said end flanges having a plurality of integral tangs spaced along the length thereof, said tangs extending in a direction outwardly away from said one side of said channel member so as to penetrate a panel member upon the driving of said panel member into the associated groove,
   said tangs being inclined relative to their associated flange in a direction to resist withdrawal of said panel member from said groove.

References Cited by the Examiner

UNITED STATES PATENTS

| 1,492,596 | 5/1924 | Fenno | 287—20.92 |
| 1,998,049 | 4/1935 | Fulton | 287—20.92 |
| 2,163,259 | 6/1939 | Moore | 287—20.92 |

FOREIGN PATENTS

| 49,741 | 1935 | Denmark. |
| 58,176 | 1940 | Denmark. |

FRANK L. ABBOTT, *Primary Examiner.*

R. A. STENZEL, *Assistant Examiner.*